Dec. 2, 1930.   E. R. HEWITT   1,783,424
BUS BODY
Filed June 29, 1928
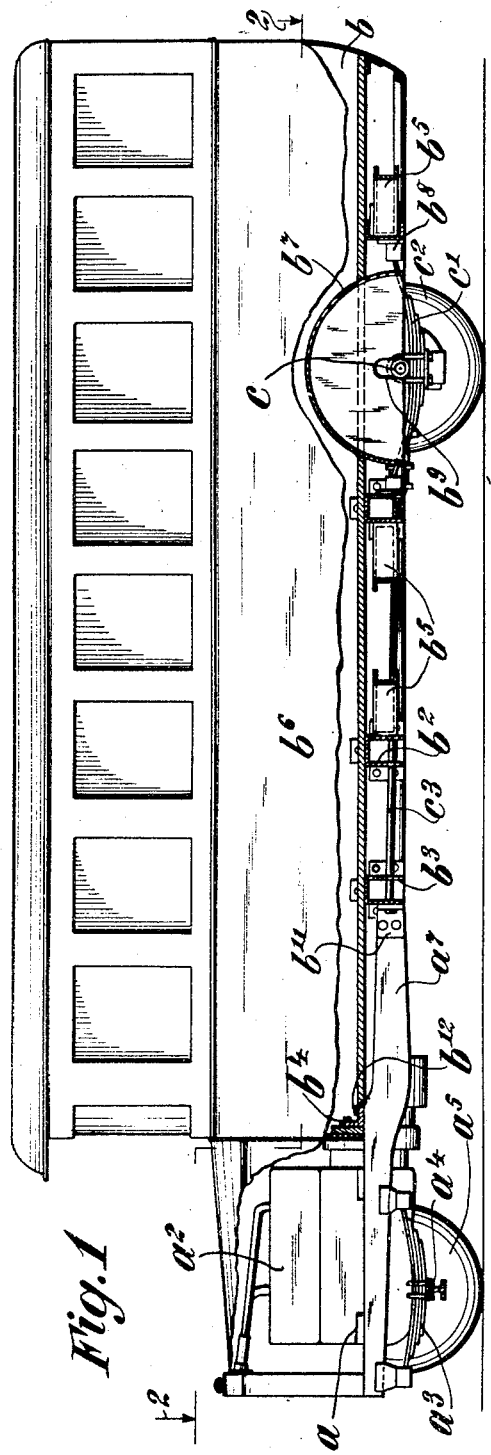
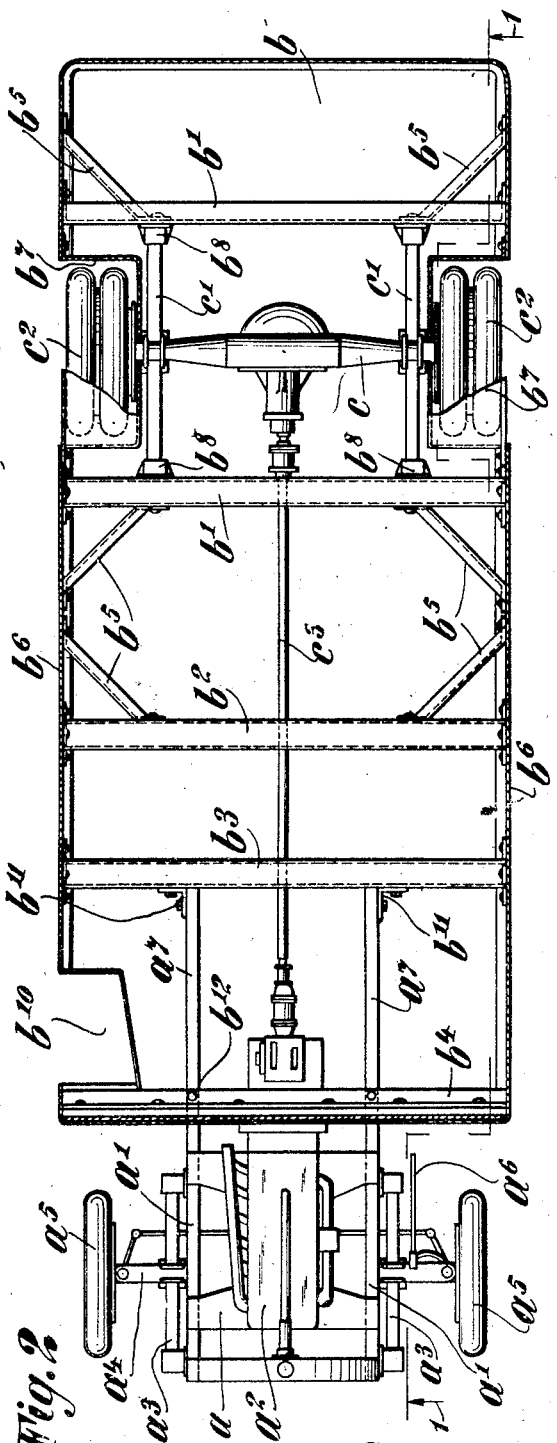
Inventor
Edward R. Hewitt
By his Attorneys
Redding, Greeley, O'Shea & Campbell Patented Dec. 2, 1930

1,783,424

UNITED STATES PATENT OFFICE

EDWARD R. HEWITT, OF MIDVALE, NEW JERSEY, ASSIGNOR TO INTERNATIONAL MOTOR COMPANY, OF NEW YORK, N. Y., A CORPORATION OF DELAWARE

BUS BODY

Application filed June 29, 1928. Serial No. 289,113.

The present invention relates to an improved vehicle construction in which the body serves as the main strengthening element between the front engine unit and the rear drive. Heretofore, vehicle constructions have included a frame upon which the body is mounted, the driving elements being mounted as a unit upon the frame, the body not serving as a strengthening element but merely as a means for carrying the passengers. Recent practice has departed from this type of construction somewhat to dispense with the conventional frame and mount everything as a unit upon the body, the latter being constructed with sufficient strength to resist the stresses and strains impressed upon the vehicle in operation.

This invention is further distinguished from the first named type of design by employing the body as a connecting and strengthening member forming the sole connection between a front engine unit and the rear drive, and an object of the invention resides in the provision of a body which is adapted to receive a rear, or final, drive and a front frame unit carrying the engine and associated driving elements. The length of the vehicle is determined entirely by the length of the body which forms the sole structural connection between the front and rear units for receiving the driving strains. A suitable propeller shaft extends from the front engine unit to the rear unit to transmit the drive thereto and the resulting ease of manufacture and assembly of the vehicle will be quite apparent.

A further object of the invention resides in the provision of a vehicle comprising three units, viz: a front engine unit, a body, and a rear axle unit; whereby the units may be interchanged with facility, thus permitting various types of engine units to be used with many types of bodies.

Further objects will appear as the invention is described more fully in connection with the accompanying drawings, wherein:

Figure 1 is a view in elevation, partly in section, and taken on line 1—1 of Figure 2 showing a vehicle constructed in accordance with the present invention.

Figure 2 is a view in section, taken on line 2—2 of Figure 1, and looking in the direction of the arrows.

Referring to the above drawings, $a$ designates a forward unit comprising side frame members $a'$ which carry an engine $a^2$. The specific construction of these elements forms no part of the present invention and a further description thereof is unnecessary at this time. Mounted upon the frame members $a'$, through springs $a^3$, is a front axle $a^4$ carrying steering wheels $a^5$. A suitable steering mechanism $a^6$ is provided of usual form, the specific construction of which may be in accordance with any well recognized design. The frame members $a'$ extend rearwardly and provide arms $a^7$ to which is connected the body described hereinafter.

The vehicle body is indicated at $b$ and includes transverse strengthening members $b'$ at the rear of the body for receiving the driving elements to be described hereinafter. Additional transverse strengthening members $b^2$, $b^3$ and $b^4$ are provided and angle braces $b^5$ may be mounted between certain of the transverse braces and the sides $b^6$ for imparting additional strength to the body. As clearly shown in Figure 2, wheel housings $b^7$ are formed at either side of the rear of the body and springs $c'$ mount rear axle housing $c$ between the transverse members $b'$. Suitable connections $b^8$ are mounted upon the transverse members $b'$ to provide the desired shackle connections between the springs and transverse members $b'$ and wheels $c^2$ are received in the wheel housings $b^7$. The wheel housings may be provided with suitable recesses or slots $b^9$ to permit movement of the axle housing $c$ with respect to the body and a propeller shaft $c^3$ transmits the power from engine $a^2$ to the rear driving unit carried by the housing $c$.

Provision is made at $b^{10}$ for a door and the body $b$ is connected to the arms $a^7$ through the forward transverse members $b^3$ and $b^4$. Angles $b^{11}$ connect arms $a^7$ to the transverse member $b^3$ and suitable bolts $b^{12}$ connect the arms to the forward transverse member $b^4$.

It will be seen that the invention, in its broadest aspect, resides in the provision of a vehicle comprising three units which are assembled in the manner described above. One of the units, the front unit, carries the engine and power plant; the other unit, the rear drive unit, serves to receive the power from the engine and drive the vehicle; and the third unit, the body, serves as the sole connection and strengthening unit of the vehicle in addition to its capacity for carrying passengers. In manufacture, the front and rear units may be run under the body and easily connected in place by the simple connections shown, the propeller shaft being of a character adapted to accommodate varying lengths of the body. With practically no changes in design, bodies of varying types can be easily mounted upon the front and rear units to provide the desired type of vehicle and the rapid production of vehicles in accordance with this, invention is greatly facilitated. Furthermore, various engine units may be used with any desired bodies with great facility, since all that is required is the disconnecting of the elements as described hereinbefore. Although the invention has been described in connection with the specific construction shown in the accompanying drawings, it is not to be limited, save as defined in the appended claim.

I claim as my invention:

In a motor vehicle composed of two sections, a load carrying section mounted upon the driving wheels and having cross frame members spaced in a fore and aft relation, a second section comprising steering wheels, parallel frame members carried thereon, an engine on said frame members, connections for rigidly securing said second section detachably to the after cross frame member of the load carrying section at points lying in the planes of the frame members, means to secure the forward cross frame member to the tops of the parallel frame members, and detachable means extending through the after cross frame member for transmitting power from the engine to the driving wheels.

This specification signed this 28th day of June, A. D. 1928.

EDWARD R. HEWITT.